United States Patent [19]
Oishi

[11] Patent Number: 5,384,660
[45] Date of Patent: Jan. 24, 1995

[54] FOLDABLE OUTSIDE REARVIEW MIRROR

[75] Inventor: Katsuyoshi Oishi, Shizuoka, Japan

[73] Assignee: Eiji Murakami, Shizuoka, Japan

[21] Appl. No.: 736,080

[22] Filed: Jul. 26, 1991

[30] Foreign Application Priority Data

Jun. 17, 1991 [JP] Japan .................. 3-053564[U]

[51] Int. Cl.⁶ ................... G02B 7/18; B60R 1/06
[52] U.S. Cl. ................... 359/841; 359/877; 248/478; 248/483; 248/900
[58] Field of Search ................ 350/604, 632, 637; 248/549, 477, 478, 479, 481, 483, 900; 359/841, 872, 873, 877

[56] References Cited

U.S. PATENT DOCUMENTS

| | | | |
|---|---|---|---|
| 4,681,409 | 7/1987 | Enomoto | 248/478 |
| 4,981,349 | 1/1991 | Tamiya et al. | 350/637 |
| 5,190,499 | 3/1993 | Mori et al. | 359/841 |

FOREIGN PATENT DOCUMENTS

| | | | |
|---|---|---|---|
| 0166378 | 1/1986 | European Pat. Off. | 350/637 |
| 3633010 | 4/1987 | Germany | 350/637 |
| 0237235 | 9/1989 | Japan | 350/637 |
| 0290754 | 11/1990 | Japan | 359/877 |

Primary Examiner—Ricky D. Shafer
Attorney, Agent, or Firm—Michael J. Striker

[57] ABSTRACT

A foldable outside rearview mirror assembly includes a shaft arranged on an extending portion of a base, a frame having an end plate rotatably inserted into a root portion of the shaft, a mirror housing secured on the frame, a positioning device is mounted on the periphery of the shaft, a first washer is arranged at the upper portion of the positioning device, a second washer is secured on the upper end of the shaft, and a coil spring is arranged around the outer periphery of the shaft between the first and the second washers. The positioning device has a plate connected to the shaft in locking the rotation thereof, several convex portions provided on the same circumference of the plate, and several concaves formed at the frame end plate to insertingly engage with the convex portions. Thereby the frame of the outside rearview mirror is prevented from moving vertically and the chattering is not caused on the mirror surface at the time of the outside mirror foldably rotates.

3 Claims, 7 Drawing Sheets

FOLDABLE OUTSIDE REARVIEW MIRROR

BACKGROUND OF THE INVENTION

The present invention relates to a door mirror of a motor vehicle and, more particularly, to a foldable outside rearview mirror having a mirror body capable of erecting and folding.

To avoid the damage of not only the mirror of itself but also the object with which the vehicle comes into collision during driving or for to narrow the vehicle width during a time when the vehicle parks in a narrow parking or when the vehicle is transmitted on board, it is well known that the door mirror of the motor vehicle is what the people call the foldable door mirror capable of holding an attitude and folding forwardly or backwardly. Such a mirror is disclosed in Japanese Utility Model Application Laid Opened Nos. Sho 61-203854 and Sho 61-139738. In the door mirror as previously described, a shaft is erected on an extending portion of a base, a socket portion of a frame is inserted into the shaft and a mirror body is secured on the frame. Further, in the door mirror, a clearance is formed between an upper surface of a root portion of the shaft and a lower surface of the socket by intermediary disposing a several of steel balls in concave portions which are respectively provided at a flat surface around the root portion of the shaft and the lower surface of the socket. A coil spring is disposed around the socket and washers and a U-shape plate for the spring are secured at the upper end of the shaft. Since the frame is attached by an elasticity of the coil spring, respective steel balls engages in each of the concave portions which are formed on both of the root portion of the shaft and the under surface of the frame. As a result the mirror body retains an determined attitude.

As previously described, in a conventional door mirror, when the mirror body is actuated to rotate from a normal attitude to the rearwardly folded attitude to avoid the collision or the like, the steel ball rotatably moves after running over any of concave portions which are disposed on the under surface of the frame or the upper surface of the root portion of the shaft, and the mirror body secured on the frame slightly raises up. When the mirror body returns to the original normal attitude again, the mirror body slightly goes down, according to the vertical movement of the mirror body, a noise of the steel ball running over concave portions is caused.

To overcome such disadvantages as described above, in the mirror which is disclosed in Japanese Patent Application Laid Opened No. Sho 64-63464 a leaf spring and a steel ball are provided around the shaft which is erected at the side of a base through the intermediary of the leaf spring. Thereby at the time of the mirror rotating, the mirror body is prevented from moving vertically by burying the steel ball. In a case as previously described, the mirror is merely pressed by the leaf spring which is provided around the comparative short shaft. Due to an insufficient holding of the mirror body, there has been a disadvantage that a chattering on the mirror surface occurs easily.

SUMMARY OF THE INVENTION

An object of the present invention is to provide a foldable rearview mirror in capable of erecting and folding the mirror body smoothly.

In accomplishing the object, according to the preferable embodiment of the present invention, there is provided an foldable rearview mirror in which a frame for attaching a mirror body retains the surface contact with an upper surface of an extending portion of a base in being restricted the vertical movement when the mirror body disposed on the base is rotated to the erected or folded attitude. In the door mirror according to the embodiment of the present invention, a ball and clutch-type door mirror positioning device which is energized by one spring is disposed around the periphery of a shaft which is erected on the extending portion of the base to hold the rotation of the frame.

The door mirror positioning device has a guide plate which is engaged in the shaft in locking the rotation thereof. A plurality of small apertures are provided on the same circumference of the guide plate. Steel balls are vertically movably inserted in the small apertures respectively and concave portions provided on an upper surface of the end plate of the frame to receive steel balls therethrough. It is possible to form steel balls of the guide plate in a form of a plurality of ball-shape projections which are integrally formed on the same circumference of the guide plate or to replace them by semicircular-shape, angle-shape or trapezoidal-shape radial projections provided on the lower surface of the guide plate. Further, the door mirror according to the present invention is applicable for an electric foldable door mirror by providing an electric motor and a speed reduction gear train in the mirror body, by mounting a clutch gear to the shaft which supports the mirror body and by attaching a door mirror positioning device between the clutch and the upper surface of the frame.

In the door mirror according to the embodiment of the present invention, in case that the steel balls run over through concaves when the mirror body rotates, only the balls which are held by the guide plate move vertically, while the frame is not subject to move vertically. Thereby a blur (a chattering) of the mirror surface is prevented from occurring and the whole of the mirror is held stably.

These and other objects and many of the attendant advantages of this invention will be readily appreciated and the same becomes better understood by reference to the following detailed description when considered in connection with the accompanying drawing.

DESCRIPTION OF THE PREFERRED EMBODIMENTS

Figure 1:
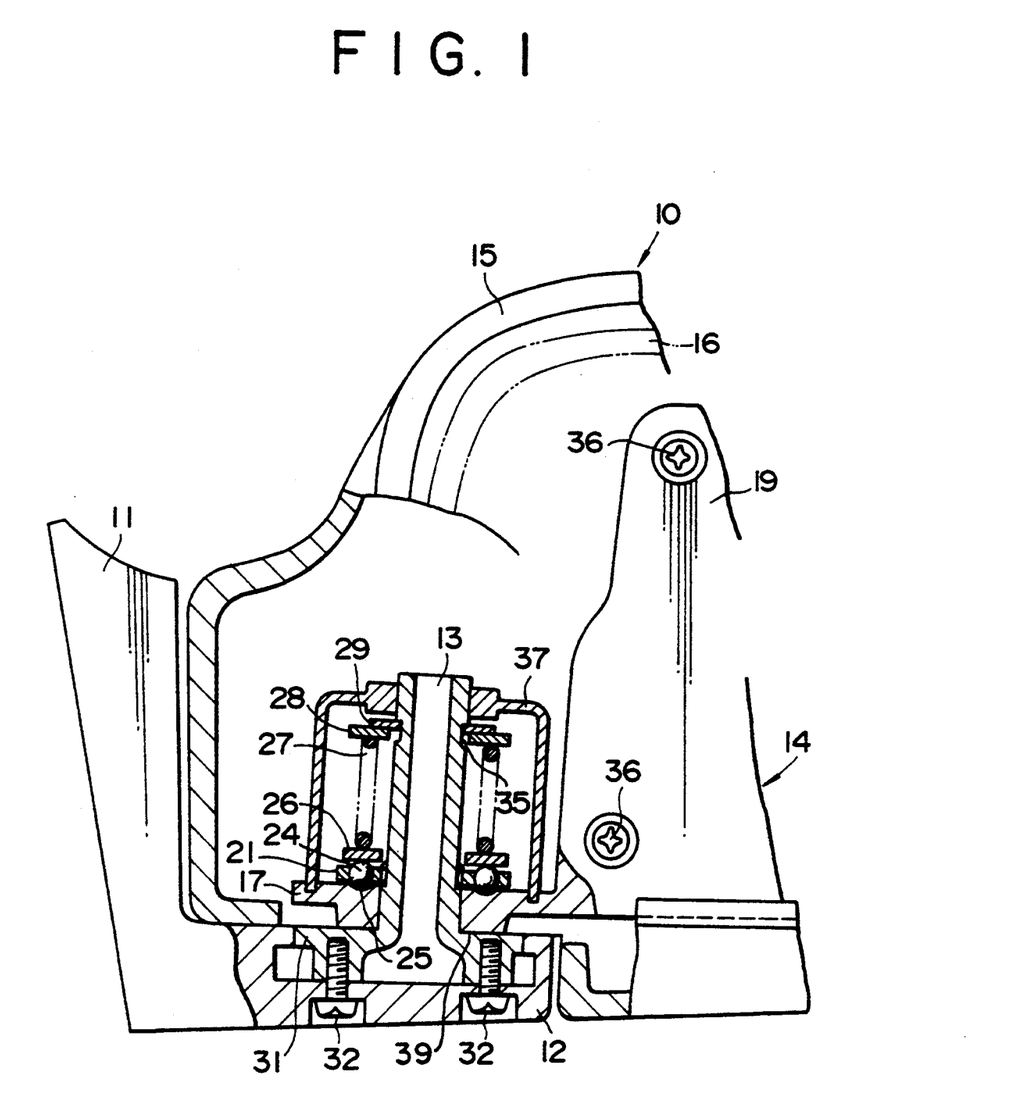
FIG. 1 is a partially fragmental front view of a foldable door mirror assembly according to one embodiment of the present invention.

The present invention will now be described in detail with reference to the drawings. Referring first to FIG. 1, there is shown an outer rearview mirror assembly 10 which is suitable to be associated with a motor vehicle includes a base 11, a shaft 13 erected on an extending portion 12 of the base 11, a frame 14 rotatably supported to the shaft 13, a mirror body (a housing) 15 secured to the frame and a mirror element 16 tiltably retained at the front portion of the frame 14.

The frame 14 comprises a flat end plate 17 through which the shaft 13 is inserted. A hole 18 is formed at an approximate center of the end plate 17 to receive the shaft therethrough, and a wing 19 forms approximate vertical surface extending from the one end of the end plate. The wing 19 is secured on the inner wall of the mirror body 15 by members 36. At the front surface of the wing 19, an actuator unit (not shown) is attached to adjust the reflection angle of the mirror. The end plate 17 contacts the surface thereof with the upper surface of the extending portion 12 and is capable of rotating and sliding around the shaft. A positioning device 20 for the frame and a coil spring 27 are disposed on the upper portion of the end plate 17.

Figure 2:
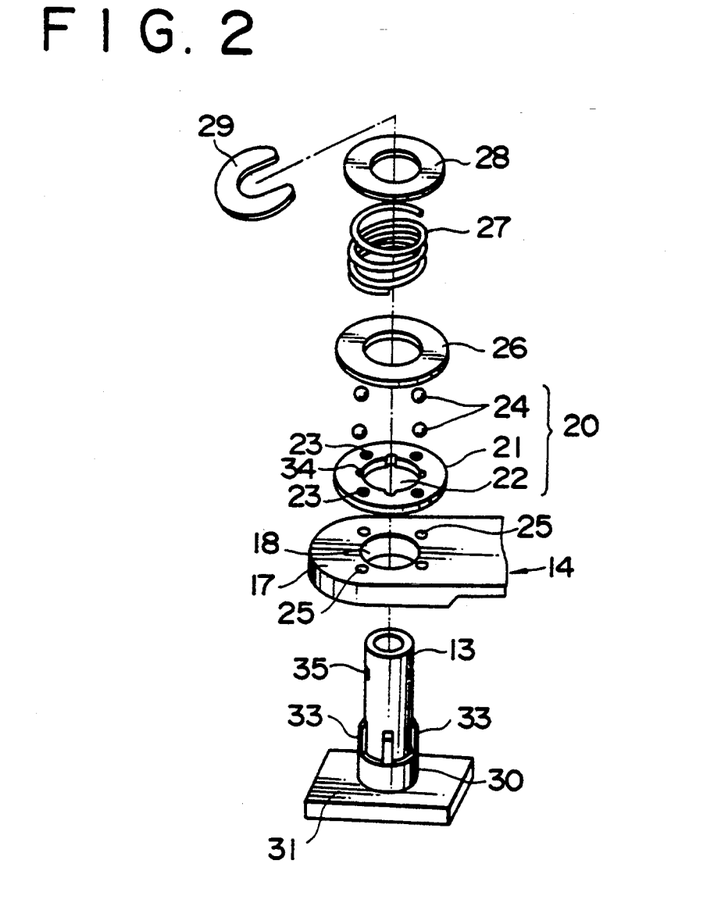
FIG. 2 is an exploded perspective view of a shaft and a positioning device of the door mirror assembly shown in FIG. 1.

The positioning device 20 has a guide plate 21 engaged with the shaft 13 in locking the rotation of itself. A plurality of small apertures 23 are provided on the same circumference of the guide plate 21. Steel balls 24 vertically movably inserted through each of small apertures 23. Concave portions 25 are provided on the upper surface of the end plate 17 of the frame to receive steel balls 24 therein, and a washer 26 is pressed to contact with the upper portion of steel balls 24 by an elasticity of the coil spring 27 (as shown in FIG. 2).

The shaft 13 has a hollow cylindrical form to receive a harness line of the actuator unit therethrough, of which a slightly larger root portion 30 has an outer diameter enable of engaging through the hole 18 of the end plate and under the root portion 30. An approximately horizontal plate portion 31 is integrally formed. The plate 31, as shown in FIG. 1, is secured on the extending portion 12 by members 32 inserted from the rear surface of the extending portion 12. Predetermined elongated projections 33 are provided at several portions of outer periphery of the shaft above the root portion 30. The projections 33 are engaged in grooves 34 provided at a hole 22 of the guide plate 21, and thereby the guide plate 21 is attached in locking the rotation thereof. The locking device is not limited to the type comprising of projections and grooves and it is possible to use a chamfer type structure or the like. A groove 35 is provided at the upper end of the shaft to receive both a washer 28 for pressing the coil spring and a U-shape plate 29 for fixing the washer therethrough. Numeral 37 shown in FIG. 1 indicates a cover to protect both of the coil spring and the positioning device and is arranged around the shaft.

Figure 3:
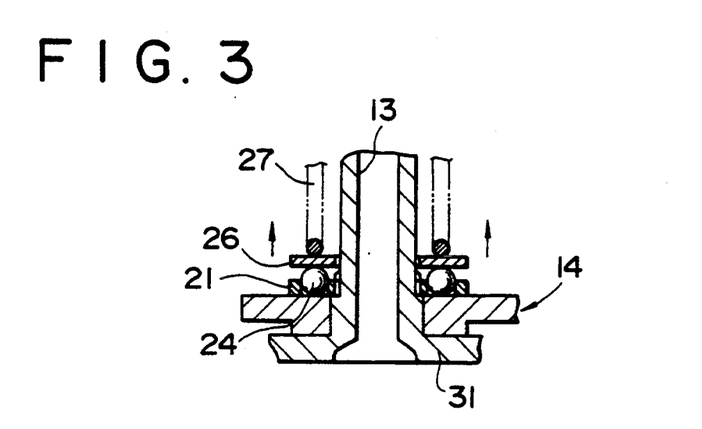
FIG. 3 is a partial section view indicating a function of balls for positioning when the door mirror rotates.

In the door mirror assembly, FIG. 1 indicates the erecting attitude of the door mirror body 15. At said attitude, each of steel balls 24 which is held by the guide plate 21 respectively engages in concave portions 25 of the end plate 17, and thereby an attitude of the mirror body 15 is retained. When the mirror body 15 is folded, the mirror body 15 rotates in retaining a slide surface 39 in contact by both the lower surface of the frame end plate and the upper surface of the plate 31 provided under the shaft. During the rotation of the mirror body, as shown in FIG. 3, steel balls 24 which are held by the guide plate 21 for locking the rotation thereof, release from concaves 25 and transfer to the upper surface of the end plate. Thereby the washer 26 is slightly raised up to press the coil spring 27. By the pressure as described above, the folding attitude of the mirror body is retained. It is possible to return the mirror body to the original erected attitude in prohibiting the vertical movement thereof due to the slide surface contact by both the frame end plate 17 and the plate portion 31 of the shaft side.

Figure 4:
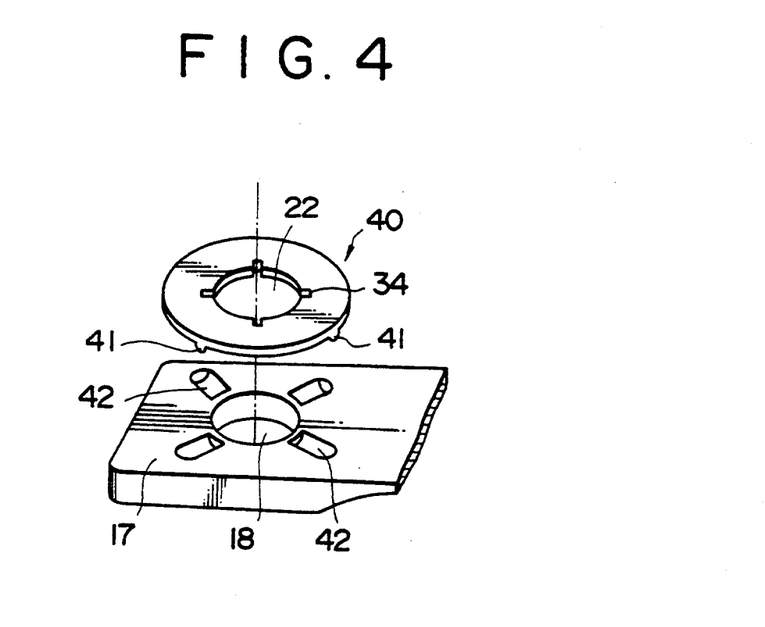
FIG. 4 is a perspective view of other embodiment of the guide plate of the positioning device.
Figure 5:
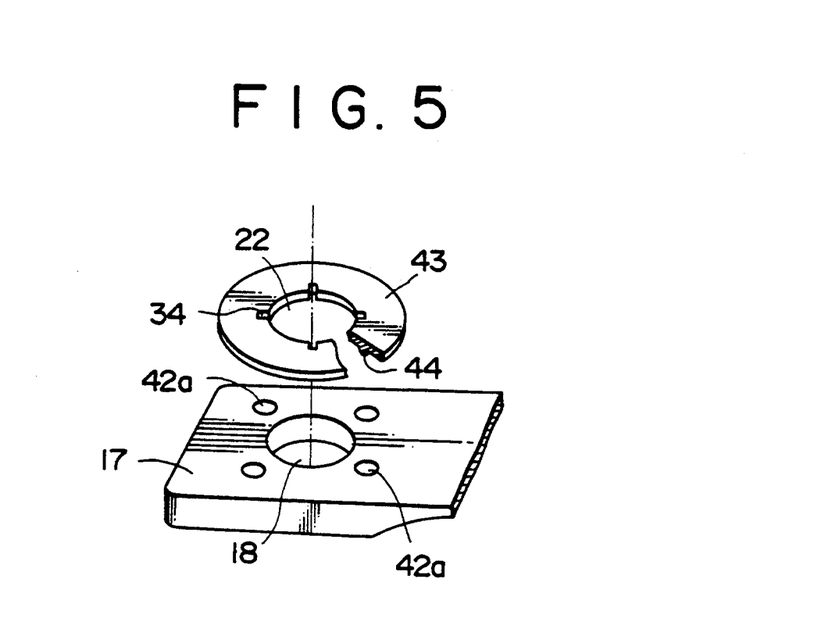
FIG. 5 is a perspective view of another embodiment of the guide plate of the positioning device.

FIG. 4 indicates the other embodiment of the positioning device. In the device, in place of steel balls, guide plate 40 is integrally formed with such as segmental semi-circular-shape, angle-shape or trapezoidal-shape projections provided at the lower radial direction thereof, and concaves 42 are provided on the upper surface of the frame end plate 17 to receive projections 41 therethrough. FIG. 5 indicates the other embodiment in which a plurality of spherical projections 44 are provided at the same radial diameter position of the lower surface of a guide plate (a ball receiving plate) 43 and are engaged in concave portions 42a of the frame end plate 17. In any of the embodiments indicated by FIGS. 4 and 5, the projections 41 engage in concaves 42 when the mirror body 15 is in the erecting attitude, and when the mirror body is in the folded attitude, said projections 41 release from concaves 42. Further at the time when the mirror body rotates, the surface is retained as previously described, and thereby the vertical movement or the chattering of the mirror body is prevented.

FIGS. 6 to 12 indicate embodiments in which a mirror assembly of the present invention is applied for an electrical foldable door mirror and same numerals are alloted to same elements which are shown in FIGS. 1 to 5.

Figure 6:
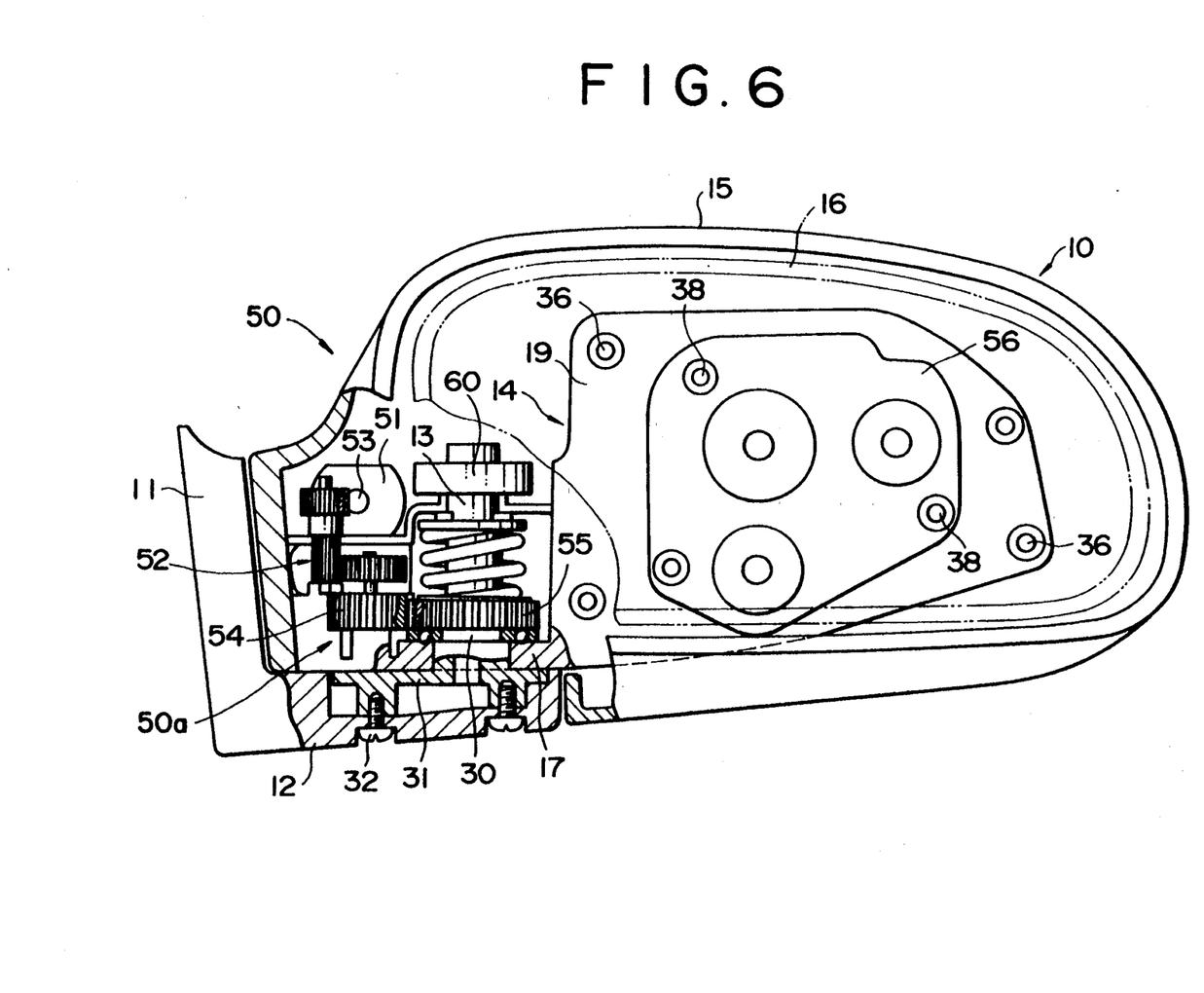
FIG. 6 is a partially fragmental front view of an embodiment of the door mirror which is applied for an electrical foldable door mirror.

An assembly shown by FIG. 6 is composed of an actuating device 50a to be further employed in the frame 14 near to the shaft 13 of the assembly as shown by FIG. 1, which includes a motor 51 and a speed reduction gear mechanism 52 connected therewith for electrically folding the mirror body 15. The speed reduction gear mechanism 52 comprises a gear train which is connected with a worm 53 of the motor output axis and an end gear 54 thereof engages a gear 55 which is lockingly mounted on the shaft 13. The wing 19 of the frame 14 is secured on the inner wall of the mirror body 15 by bis 36, 36 and an actuator unit 56 is secured on the front surface of the wing 19 by members 38 to adjust the reflection angle of the mirror element 16. The shaft 13 has a hollow cylindrical form to receive a harness line (not shown) of the actuator unit 56 therethrough. The numeral 60 of FIG. 6 indicates a switch for detecting the rotating position of the mirror body.

Figure 7:
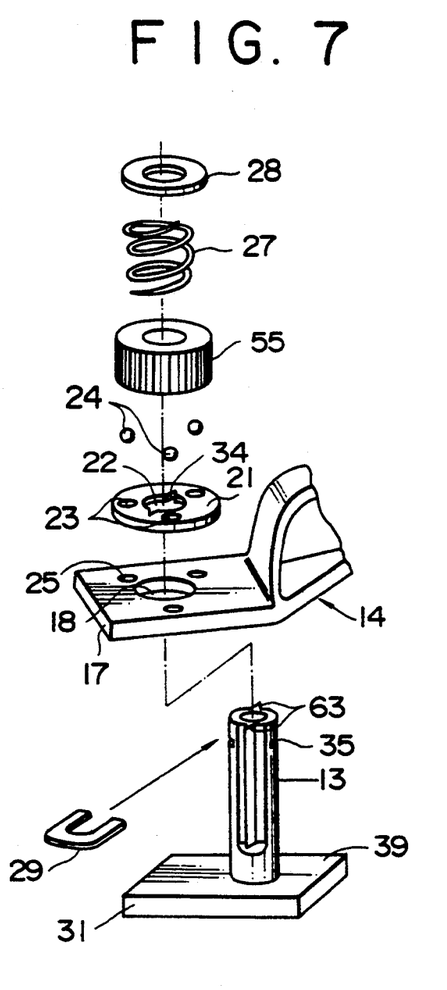
FIG. 7 is an exploded perspective view of the shaft and the positioning device according to the embodiment of the present invention described by FIG. 6.
Figure 8:
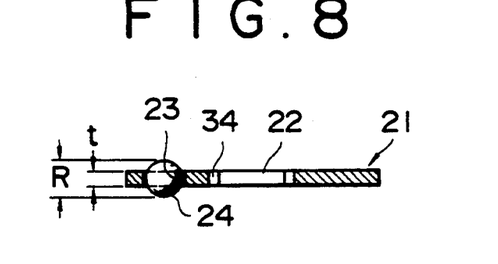
FIG. 8 is a section view indicating steel balls retained in the guide plate of the positioning device shown in FIG. 7.
Figure 9:
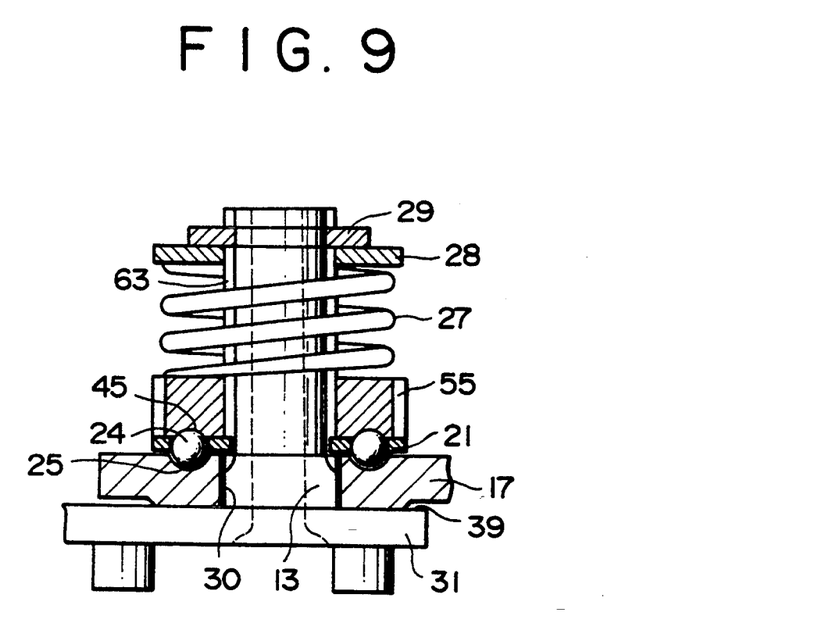
FIG. 9 is an enlarged sectional view of the periphery of the shaft shown in FIG. 6.

FIG. 7 indicates an exploded perspective view of the relation of the shaft and the frame. Along the generatrix direction of the shaft 13, projection strips 63 are formed. The shaft 13 which is upwardly inserted through the hole 18 provided on the end plate 17 of the frame, is mounted relative to the positioning plate 21 provided with apertures 23 for retaining a plurality of steel balls 24, the gear 55, the spring 27 and the washer 28. Further the U-shape plate 29 is engaged through the upper stage groove 35. The lower surface of the frame end plate 17 and the upper surface of the plate 31 form a rotating slide surface 39. On the concentric circle between the lower surface of the gear 55 and the upper surface of the end plate 17, concaves 25, 45 are respectively formed to receive steel balls 24 (as shown in FIG. 9). Grooves 34 are provided at the axial hole 22 of the positioning plate 21 in the embodiment which is indicated in FIG. 7. Projection strips 63 of the shaft 13 are engaged in the grooves 34 to mount the shaft in locking the rotation thereof. Further as shown in FIG. 8, the guide plate 21 has a plurality of apertures 23 on the same circumference thereof, and steel balls 24 are vertically movably retained therein. In comparison of the diameter R of the steel balls 24, the thickness t of the guide plate 21 is set to be very thin.

FIGS. 6 and 9 indicate an attitude of the mirror body 15 staying in a neutral position, that is, in a normal position. Steel balls 24 adequately engage in concaves 25, 45 which are formed on the surface where the frame 14 and the clutch gear 55 located opposite with each other.

When the mirror body is electrically folded, the motor 51 is actuated to rotate the mirror body 15 from the normal attitude to the rearwardly or forwardly folded attitude by the frame 14. The end gear 54 of the speed reduction gear train which engage with the clutch gear 55 rotates around the periphery of the shaft 13. At that time, the ball clutch which is formed by steel balls 24 and concaves 25, 45 functions effectively. Thereby in accordance with the rotation of the end gear 54, the frame 14 rotates around the periphery of the shaft. Resultantly the mirror body can be rotated in the determined folded position.

When an accidental impact on the mirror body occurs the steel balls 24 provided between the frame end plate 17 and the clutch gear 55 are instantly affected by a larger external force than the torque of releasing the steel balls from the concave portions 25, 45 in the tangent direction thereof. Thus effects each or both engagements of the balls with concaves and, thereby the mirror body is forced to rotate.

When the mirror body is returned from the folded attitude to the normal attitude, the frame 14 is rotated in reverse from the present position. It returns to the original position by rotating the slide surface 39 by contacting the plate portion 31 with the lower surface of the frame end plate centering around the shaft 13. When the mirror body is forced to rotate manually, the steel balls 24 are affected by a larger external force than the torque to release it from the concave portions 25, 45 in the tangent direction thereof. Thereby the engagement of the clutch gear 55 with the steel balls 24 is released to rotate the mirror body at the determined folded attitude.

Figure 10:
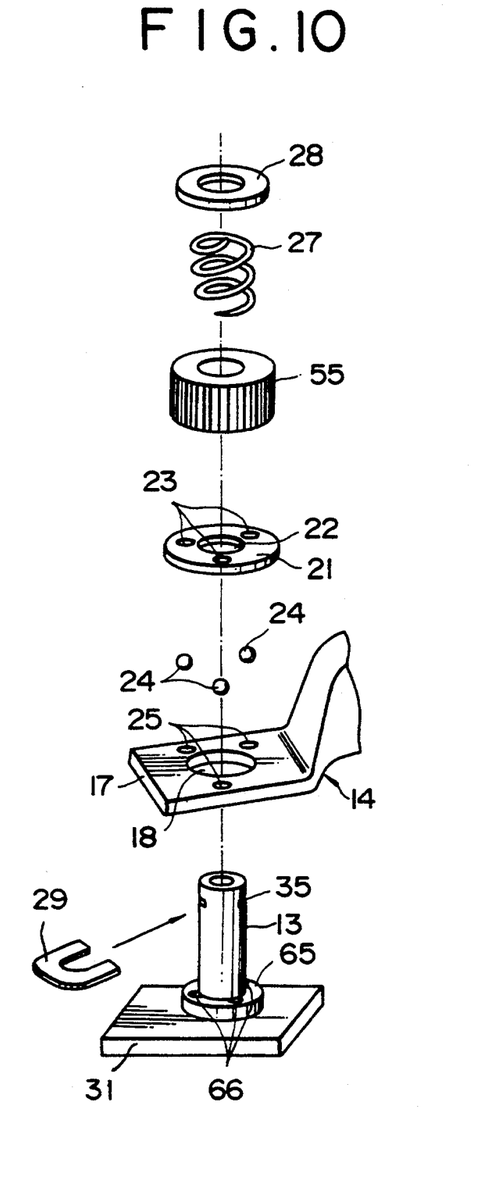
FIG. 10 is an exploded perspective view of other embodiment of the electric foldable door mirror shown in FIG. 6.
Figure 11:
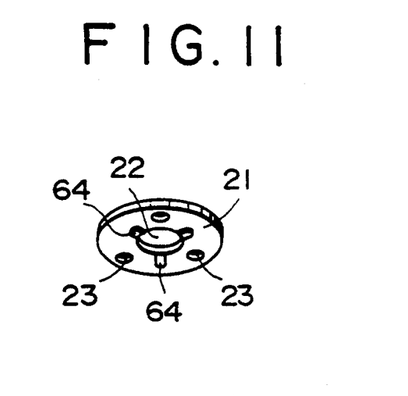
FIG. 11 is a perspective view of a rear side the guide plate according to the embodiment shown in FIG. 10.

FIG. 10 is an exploded view of the embodiment of the present invention in which a locking means of the guide plate is separately formed. A plurality of projections 64 are provided around the periphery of the axial hole 22 under the guide plate 21 which is intermediary attached between the frame end plate 17 and the gear 55 (as shown in FIG. 11). The projections 64 are respectively engaged in a plurality of apertures 66 provided at a stage 65 which is formed on the plate 31. Thereby the guide plate 21 is connected to the shaft 13 in locking the rotation thereof.

Figure 12:
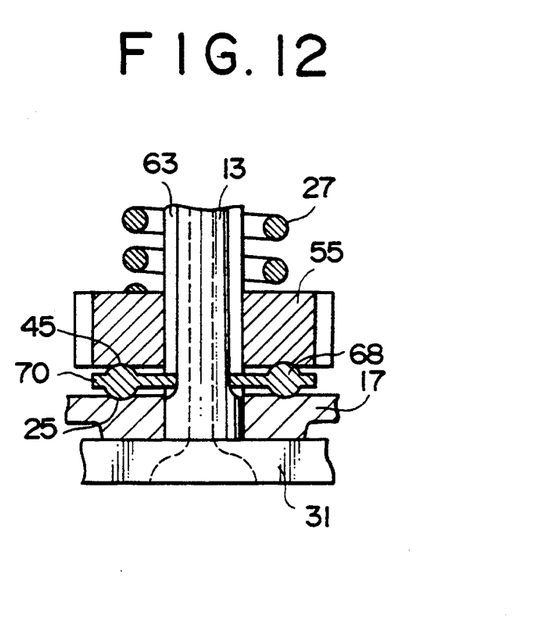
FIG. 12 is a section view of the embodiment in which other guide plate is mounted in the assembly shown in FIG. 9.

In the embodiments which are respectively illustrated by FIGS. 7 and 10, a convex portion provided in the positioning device is composed of the guide plate steel balls. The guide plate has a through hole capable of loosely retaining a plurality of steel balls on the same circumference and is connected with the shaft located on the base for locking the rotation. The steel balls are vertically movably disposed in said through hole. As shown in FIG. 12, it is possible to untie the balls with the guide plate. That is, a plate-shape member 70 can be integrally formed with a plurality of ball-shape convexes 68 and non-rotatably and vertically movably attached with the shaft by a projecting strip 63 (illustrated by FIG. 7) formed in a direction of generatrix of the shaft 13 and a locking groove 34 through which the projection strip engages.

Further, in place of the ball-shape convex (as shown in FIG. 12), it is possible to form a plurality of segmental trapezoidal or triangle projections as shown in FIGS. 5 and 6 integrally with the plate member in a radial direction. Radial concave portions are also provided on the lower surface of the gear 55 and the upper surface of the frame end plate.

In embodiments illustrated in figures following after FIG. 7, same effects. That is, if the vibration of the vehicle body or an external force such as a rotation of the mirror body is added, the frame does not move vertically and no chattering are caused in the mirror body.

What is claimed is:

1. A foldable outside rearview mirror assembly, comprising a mirror body; a base having an extending portion; a shaft arranged on said extending portion of said base and having a root portion; a frame rotatably supported on said root portion of said shaft, said frame having an end plate which is rotatably and slidably contacting a surface of said extending portion of said base and receiving said root portion of said shaft; an actuating device for folding said mirror body and including a motor and a speed reduction gear provided in said mirror body, a clutch gear mounted to said shaft which rotatably supports said mirror body, a speed reduction gear train having an end gear engaging with said clutch gear, said base having an upper surface which forms a rotatable sliding surface contacting a lower surface of said frame; a spring device attached to said shaft and energizing said clutch gear to a side of said base, said shaft being provided with a positioning plate inserted in a clearance between said clutch gear and said frame, said positioning plate having convex portions on both surfaces, and said clutch gear and said end plate respectively being provided with concave portions on respective surfaces so that when said gear and said positioning plate are opposite to one another they receive said convex portions.

2. A foldable outside rearview mirror assembly as defined in claim 1, wherein said positioning plate includes a guide plate having apertures; and further comprising a plurality of ball members loosely retained in said apertures at an equal radial distance around said shaft, said guide plate being secured to said shaft, said ball members being movable in a vertical direction.

3. A foldable outside rearview mirror assembly as defined in claim 2, wherein said positioning plate is integral with a plurality of projections provided on an equal radial diameter around said shaft.

* * * * *